United States Patent
Hata et al.

(10) Patent No.: US 9,283,927 B2
(45) Date of Patent: Mar. 15, 2016

(54) WEBBING TAKE-UP DEVICE

(75) Inventors: Yasunori Hata, Aichi-ken (JP); Akira Sumiyashiki, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 728 days.

(21) Appl. No.: 13/555,535

(22) Filed: Jul. 23, 2012

(65) Prior Publication Data

US 2013/0026277 A1  Jan. 31, 2013

(30) Foreign Application Priority Data

Jul. 26, 2011  (JP) .................. 2011-163300

(51) Int. Cl.
*B60R 22/34* (2006.01)

(52) U.S. Cl.
CPC ....... *B60R 22/341* (2013.01); *B60R 2022/3402* (2013.01)

(58) Field of Classification Search
USPC ........... 242/379, 379.1, 379.2; 280/801.1, 280/805–807; 297/468, 470–472, 475–478, 297/480
See application file for complete search history.

(56) References Cited

U.S. PATENT DOCUMENTS

| | | | | | |
|---|---|---|---|---|---|
| 3,632,059 | A | * | 1/1972 | Loose | B60R 22/353 200/61.58 B |
| 3,941,330 | A | * | 3/1976 | Ulrich | B60R 22/38 242/379.1 |
| 3,958,773 | A | * | 5/1976 | Sugar | B60R 22/40 242/379.1 |
| 4,159,084 | A | * | 6/1979 | Mori | B60R 22/36 242/378.1 |
| 4,381,086 | A | * | 4/1983 | Pfeiffer | B60R 22/34 242/379.1 |
| 4,438,551 | A | * | 3/1984 | Imai | H01L 21/31 242/381.4 |
| 4,562,977 | A | * | 1/1986 | Hollowell | B60R 22/353 242/382.1 |
| 4,620,357 | A | * | 11/1986 | Fohl | B60R 22/34 29/428 |
| 4,623,104 | A | * | 11/1986 | Mori | B60R 22/34 242/376 |
| 4,773,613 | A | * | 9/1988 | Kawai | B60R 22/42 242/381.4 |

(Continued)

FOREIGN PATENT DOCUMENTS

| | | |
|---|---|---|
| CN | 1843811 | 10/2006 |
| JP | H02108854 U | 8/1990 |

(Continued)

OTHER PUBLICATIONS

Japanese Application 2011-163300 Office Action dated Jun. 9, 2014 and English translation thereof.

(Continued)

*Primary Examiner* — Eammanuel M Marcelo
*Assistant Examiner* — Angela Caligiuri
(74) *Attorney, Agent, or Firm* — Roberts Mlotkowski Safran & Cole, PC

(57) ABSTRACT

A webbing take-up device is provided capable of preventing or suppressing a frame from deforming such that one of leg-plates or a back-plate displaces towards the other. A face on the center of curvature side of a curved portion of a front back plate section configuring the frame and a one width direction edge namely an upper edge of a bar support face each other along the up-low direction. When the front edge sides of leg-plates are displaced to rise due to a webbing being pulled, the one width direction edge of the bar support interferes with a front end of the front back plate section to prevent or suppress the front edge sides of the leg-plates from rising further. Deformation of the frame caused by the front edge sides of the leg-plates to rise can accordingly be prevented or suppressed.

9 Claims, 2 Drawing Sheets

(56) References Cited

U.S. PATENT DOCUMENTS

| | | | | |
|---|---|---|---|---|
| 5,137,226 A | * | 8/1992 | Fujimura | B60R 22/42 242/377 |
| 5,163,708 A | * | 11/1992 | Kotama | B60R 22/4619 242/374 |
| 5,332,291 A | * | 7/1994 | Fujimura | B60R 22/405 242/383.4 |
| 5,443,223 A | * | 8/1995 | Yosin | B60R 22/34 242/379 |
| 2004/0021027 A1 | * | 2/2004 | Kohlndorfer | B60R 22/34 242/379.1 |
| 2010/0123348 A1 | * | 5/2010 | Hiramatsu | B60R 22/4676 297/476 |
| 2010/0123349 A1 | * | 5/2010 | Murakami | B60R 22/34 297/476 |
| 2010/0176236 A1 | * | 7/2010 | Clute | B60R 22/3413 242/394 |
| 2010/0301151 A1 | * | 12/2010 | Heitkamp | B60R 22/341 242/379.1 |
| 2011/0147509 A1 | * | 6/2011 | Wang | B60R 22/3413 242/374 |
| 2012/0234957 A1 | * | 9/2012 | Wier | B60R 22/34 242/379.1 |
| 2013/0270380 A1 | * | 10/2013 | Ellison | B60R 22/34 242/379 |

FOREIGN PATENT DOCUMENTS

| | | |
|---|---|---|
| JP | 9086342 A | 3/1997 |
| JP | 2011131843 | 7/2011 |

OTHER PUBLICATIONS

Chinese Application 201210210925.X Office Action dated Aug. 5, 2015 and English translation thereof.

\* cited by examiner

_US 9,283,927 B2_

WEBBING TAKE-UP DEVICE

CROSS-REFERENCE TO RELATED APPLICATION

This application claims priority under 35 USC 119 from Japanese Patent Application No. 2011-163300 filed Jul. 26, 2011, the disclosure of which is incorporated by reference herein.

BACKGROUND OF THE INVENTION

1. Field of the Invention

The present invention relates to a webbing take-up device for configuring a vehicle seat belt device.

2. Related Art

A frame of a webbing take-up device for a seat belt device compatible with a vehicle rear seat is, as described for example in Japanese Patent Application Laid-Open (JP-A) No. 9-86342, configured with a back plate having its thickness direction which is along the vehicle up-down direction. Leg plates extend downwards from the left and right edges of the back plate, and a length direction base end side of a webbing is anchored to a spool provided between the leg plates.

In such a webbing take-up device for rear seat, the back plate of the frame is split into vehicle rear side and vehicle front side portions, or a hole is formed at a front-rear direction intermediate portion of the back plate. The webbing being pulled out from the spool passes through between the front portion and the rear portion of the back plate, or through the hole referred to above. The webbing is pulled out forwards, above the back plate towards the top end of the seatback.

In a webbing take-up device configured in such a manner, leg plates extend out from the two width direction edges of the frame back plate towards one side in the thickness direction of the back plate, and the two axial direction ends of the spool are either directly or indirectly supported by the leg plates. Thus pulling force is transmitted to the leg plates through the spool when the webbing is being pulled out, thereby pulling the leg plates towards the back plate side. The pulling force accordingly attempts to deform the frame so as to displace the leg plates towards the back plate side.

SUMMARY OF THE INVENTION

In consideration of the above circumstances the present invention is directed towards a webbing take-up device that can prevent or suppress the frame from deforming such that one of the back plate or the leg plates is displaced towards the other.

A webbing take-up device according to a first aspect of the present invention includes: a frame in which a pair of leg plates extend from a plate shaped back plate towards one side in a thickness direction of the back plate; a spool that is provided between the pair of leg plates, an axial direction of the spool being along a facing direction of the pair of leg plates and both ends of the spool being directly or indirectly supported by the pair of leg plates; a webbing having a base end that is anchored to the spool, the webbing being pulled out towards the other side which is an opposite side from the one side in the thickness direction of the back plate and extending along the back plate; and an interfering member that is provided at the leg plates at the one side in the thickness direction of the back plate with respect to the back plate, the interfering member interfering with the back plate so as to restrict deformation of the frame in a direction in which the leg plates approach the back plate.

According to the webbing take-up device of the first aspect of the present invention, the frame is equipped with the back plate. The pair of leg plates extends out from the back plate towards one side in the back plate thickness direction. The spool is provided between the leg plates and oriented with its axial direction which is along the direction the leg plates facing each other. The base end side of the webbing is anchored to the spool.

The leading end side of the webbing is pulled out towards the other side in the back plate thickness direction and extends along the back plate. Hence when, for example, the webbing is pulled towards the webbing length direction leading end side, the spool is pulled towards the back plate side. The both axial direction ends of the spool are supported directly or indirectly by the leg plates. The leg plates are accordingly also pulled towards the back plate side by the spool being pulled towards the back plate side. The interfering member is provided at the leg plates at the one side in the back plate thickness direction. The interfering member therefore interferes with the back plate from the one side in the back plate thickness direction when the leg plates are pulled towards the back plate side and the leg plates attempt to displace. Displacement of the leg plates towards the back plate side is accordingly restricted, and deformation of the frame such that the leg plates displace towards the back plate side, namely deformation of the frame such that the leg plates separate away from each other, can be prevented or suppressed.

A webbing take-up device according to a second aspect of the present invention is the first aspect of the present invention wherein the interfering member is a reinforcement member configured such that: one end of the reinforcement member is anchored to one of the pair of leg plates and the other end of the reinforcement member is anchored to the other of the pair of leg plates to restrict displacement of the leg plates in a direction in which the pair of leg plates are away from each other; and the reinforcement member is capable of interfering with the back plate from the one side in the thickness direction of the back plate.

According to the webbing take-up device of the second aspect of the present invention the reinforcement member is provided to the frame. The one end of the reinforcement member is anchored to one of the pair of leg plates and the other end of the reinforcement member is anchored to the other of the pair of leg plates. When load is applied to the frame so as to attempt to separate the pair of leg plates from each other, the reinforcement member, provided so as to connect together the pair of leg plates separately to (in addition to) the back plate, restricts deformation attempting to move the pair of leg plates away from each other.

The reinforcement member is provided so as to be capable of interfering with the back plate from the one side in the back plate thickness direction. The reinforcement member therefore interferes with the back plate from the one side in the back plate thickness direction when the leg plates deform (or attempts to deform) such that the leg plates displace towards the back plate side. Deformation of the frame as a whole can thereby be prevented or suppressed.

A webbing take-up device according to a third aspect of the present invention is the first or second aspect of the present invention, wherein the interfering member is formed in a plate shape with a width direction thereof being along the thickness direction of the back plate, and one end in the width direction of the interfering member is capable of interfering with the back plate.

According to the webbing take-up device of the third aspect of the present invention, the interfering member is formed in a plate shape. The width direction of the interfering member is along the back plate thickness direction, and the one width direction edge of the interfering member restricts deformation of the back plate by interfering with the back plate. Due to such a structure in which the interfering member receives load from the back plate with the one width direction edge of the interfering member, the interfering member has a high rigidity to load receiving from the back plate and can efficiently prevent or suppress the frame from deforming.

In the above aspects, it is possible that one end side of the back plate in a direction orthogonal to the thickness direction of the back plate and one end in a width direction of the interfering member are positioned adjacent and face each other along the thickness direction of the back plate.

In the above aspects, it is possible that the one end side of the back plate in the direction orthogonal to the thickness direction of the back plate is configured by a curved portion that curves towards the one side in the thickness direction of the front back plate.

In the above aspects, it is possible that a face of the curved portion on a side of the spool and the one end in the width direction of the interfering member are positioned to face each other.

In the webbing take-up device of the present invention as explained above, one of the leg plates or the back plate can be prevented or suppressed from displacing towards the other, and such deformation of the frame can be prevented or suppressed.

BRIEF DESCRIPTION OF THE DRAWINGS

Exemplary embodiments of the present invention will be described in detail based on the following figures, wherein:

FIG. 2A illustrates a normal state of the webbing take-up device and FIG. 2B illustrating a state of the webbing take-up device in which leg plates are in a displaced state due to pulling force from webbing.

DETAILED DESCRIPTION OF THE INVENTION

Configuration of an Exemplary Embodiment

Figure 1:
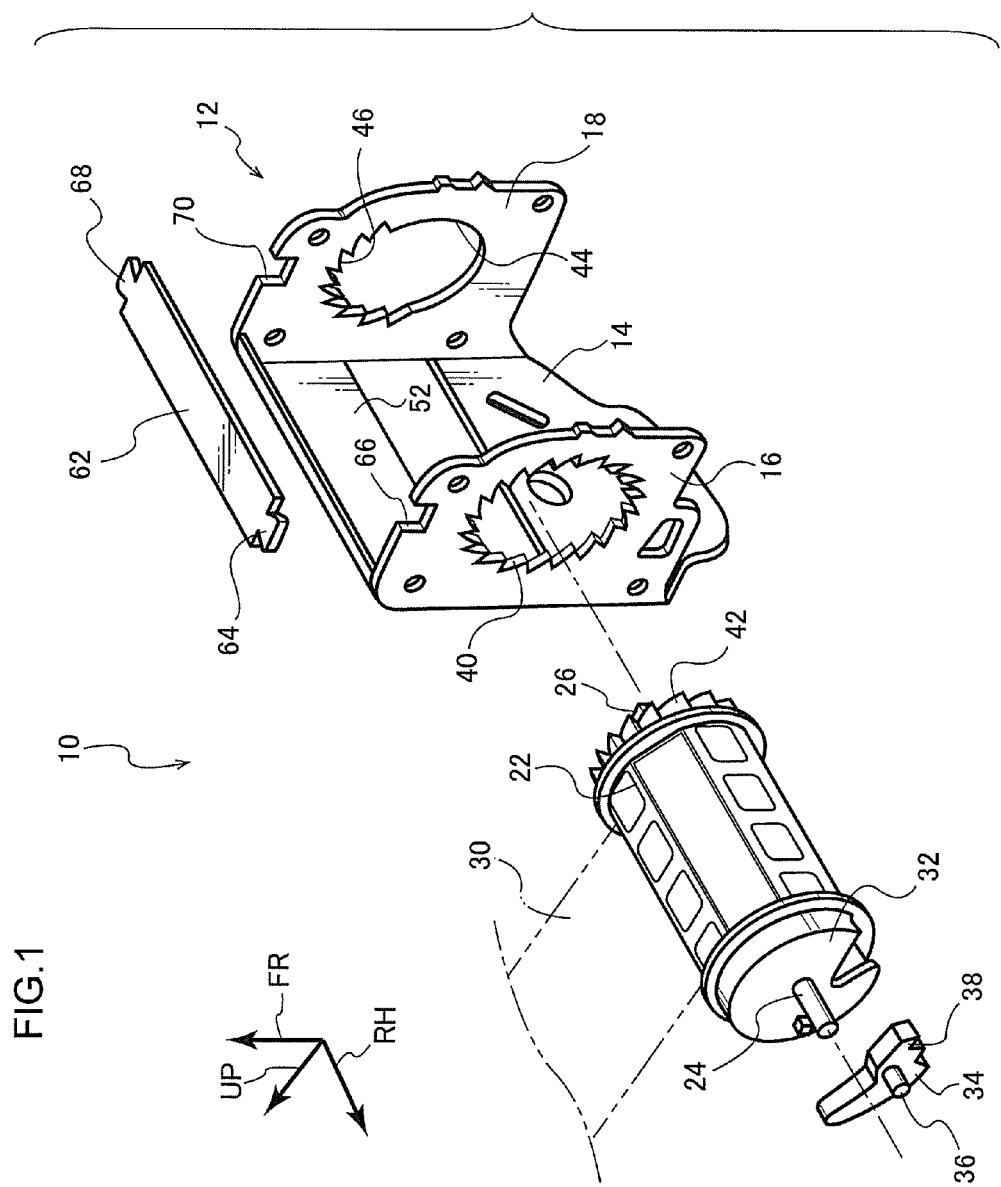
FIG. 1 is an exploded perspective view of relevant portions of a webbing take-up device according to an exemplary embodiment of the present invention.

FIG. 1 is a schematic exploded perspective view illustrating a configuration of relevant portions of a webbing take-up device 10 according to an exemplary embodiment of the present invention. For each of the drawings included in FIG. 1 the arrow FR indicates the front in the front-rear direction of a vehicle (not shown in the drawings) installed with the webbing take-up device 10, the arrow UP indicates up in the up-down direction of the vehicle installed with the webbing take-up device 10, and arrow RH indicates the right direction in the left-right (width) direction of the vehicle installed with the webbing take-up device 10.

As shown in FIG. 1, the webbing take-up device 10 is equipped with a frame 12. The frame 12 is, for example, integrally fixed to the vehicle body by fasteners such as bolts at the rear of the upper end portion of a seatback configuring a vehicle rear seat. The frame 12 is equipped with a rear back plate section 14. The rear back plate section 14 is formed in a plate shape with its thickness direction being along the top-bottom (up-low) direction. A pair of leg plates 16 and 18 extend out from the two (both) left and right ends of the rear back plate section 14 towards one side in a rear back plate section 14 thickness direction (towards the lower side).

A spool 22 is disposed between the leg plate 16 and the leg plate 18. The spool 22 is formed in a substantially circular pillar shape (or substantially circular cylindrical shape) whose axial direction is along a direction in which the leg plate 16 and the leg plate 18 face each other. A shaft section 24 is formed so as to project out coaxially to the spool 22 from the end portion of the spool 22 on the leg plate 16 side. The shaft section 24 is rotatably supported by a housing of a lock mechanism (not shown in the drawings) fixed to the leg plate 16 at the outside of the leg plate 16 (the opposite side of the leg plate 16 to the leg plate 18 side).

A shaft section 26 projects out coaxially to the spool 22 from the leg plate 18 side end of the spool 22. The shaft section 26 is rotatably supported by a spring case (not shown in the drawings) fixed to the leg plate 18 at the outside of the leg plate 18 (the opposite side of the leg plate 18 to the leg plate 16 side). The spool 22 is thereby indirectly and rotatably supported by the frame 12.

A length direction base end side of webbing 30 formed in an elongated strip shape is anchored to the spool 22. The webbing 30 is wound in layers on the outer peripheral portion of the spool 22 and stored thereon when the spool 22 rotates in a take-up direction, this being one rotation direction of the spool 22 about its axial direction center. A spool biasing member such as a spiral spring, for example, is housed inside the spring case. Biasing force from the spool biasing member increases when the spool 22 is rotated in the pull-out direction, which is the opposite direction to the take-up direction, as the webbing 30 is being pulled out from the spool 22, such that the spool 22 is biased in the take-up direction.

A pawl housing section 32 is formed between the main body portion of the spool 22 and the shaft section 24, and a lock pawl 34 is housed inside the pawl housing section 32. Each member of the lock mechanism is housed inside the above mentioned lock mechanism housing. The lock mechanism actuates when rapid vehicle deceleration occurs or when there is a specific magnitude of rotational acceleration of the spool 22 in the pull-out direction. The lock mechanism engages with a pin 36 formed so as to protrude out from the lock pawl 34 towards the opposite side to the spool 22 main body portion.

The lock pawl 34 is pulled out from the pawl housing section 32 when the spool 22 is rotated further in the pull-out direction with the lock mechanism in the actuated state. Ratchet teeth 38 are formed to the lock pawl 34. The ratchet teeth 38 face ratchet teeth 40 formed on the leg plate 16 in the spool 22 rotation radial direction. The ratchet teeth 38 mesh with the ratchet teeth 40 of the leg plate 16 when the lock pawl 34 is pulled out from the pawl housing section 32. Rotation of the spool 22 in the pull-out direction is thereby restricted.

An outside-toothed ratchet wheel 42 is formed between the main body portion of the spool 22 and the shaft section 26. The ratchet wheel 42 is formed so as to be coaxial to both the spool 22 and the shaft section 26. The ratchet wheel 42 faces the inner peripheral portion of a through hole 44 formed to the leg plate 18 in the spool 22 rotation radial direction. Timer ratchet teeth 46 are formed to the portion of the inner peripheral portion of the through hole 44 positioned on the vehicle front side. Therefore when, for example, tension of the webbing 30 displaces the spool 22 forwards, the ratchet wheel 42 engages with the ratchet teeth 46 formed to the through hole 44 of the leg plate 18 and thereby restricts rotation of the spool 22 in the pull-out direction.

As shown in FIG. 1, a front back plate section 52, serving as the "back plate" recited in the aspect of the patent invention, is formed further forward than the rear back plate section 14. The front back plate section 52 joins together the two (both) vehicle upper side portions of the leg plates 16 and 18 at positions further towards the front side than the rear back plate section 14. As shown in FIG. 2, the webbing 30 that has been pulled out from the spool 22 passes through between the rear back plate section 14 and the front back plate section 52, and extends out forwards along the upper face of the front back plate section 52 (the face of the front back plate section 52 on the opposite side to the leg plates 16 and 18). While not shown in the drawings, the webbing 30 also passes above the seatback of the rear seat, then extends towards the vehicle downwards along the front face of the seatback, and passes through a gap between the seatback and a seat cushion. The leading end of the webbing 30 is fixed to the vehicle body.

Figure 2A:
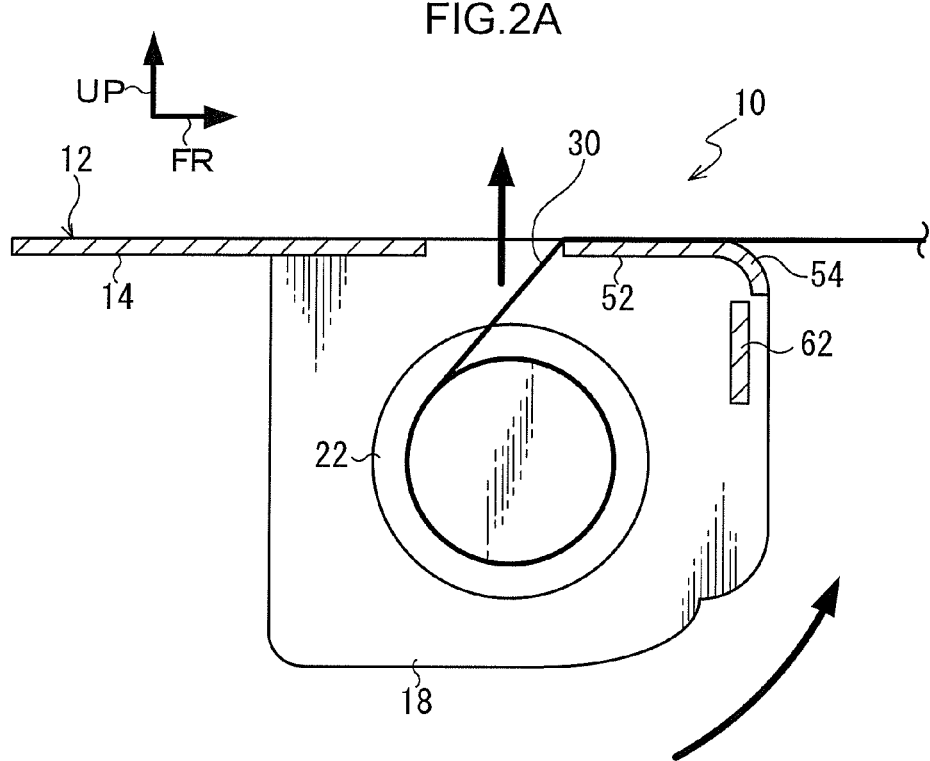
FIG. 2A and FIG. 2B are cross-sections of relevant portions of a webbing take-up device according to an exemplary embodiment of the present invention.

As shown in FIG. 1 and FIG. 2A, the front end side (the one end side in a direction orthogonal to the thickness direction of the front back plate section 52) of the front back plate section 52 is configured by a curved portion 54 that curves around downwards (towards one side in the thickness direction of the front back plate section 52). A bar support 62 is provided below (at lower side) the distal end (tip end) of the curved portion 54 (the end portion of the front back plate section 52 on the opposite side to the rear back plate section 14). The bar support 62 configures an interfering member serving as a reinforcement member. The bar support 62 is formed as a plate shape with a length direction which is along the facing direction of the leg plate 16 and the leg plate 18 and with a width direction which is along the vehicle up-low direction.

A caulking (crimping) tab 64 is formed at a first (one) length direction end of the bar support 62. A fitting groove 66 is formed in leg plate 16 so as to correspond to the caulking tab 64. The fitting groove 66 is formed to open forwards (open at the front side) on the vehicle front end portion of the leg plate 16. The caulking tab 64 is integrally coupled to the leg plate 16 by being caulked (crimped) together in a state fitted into the fitting groove 66.

A caulking (crimping) tab 68 is formed at the second (another) length direction end of the bar support 62. A fitting groove 70 is formed in the leg plate 18 so as to correspond to the caulking tab 68. The fitting groove 70 is formed to open forwards (open at the front side) on the vehicle front end portion of the leg plate 18. The caulking tab 68 is integrally coupled to the leg plate 18 by being caulked (crimped) together in a state fitted into the fitting groove 70.

By thus integrally coupling the caulking tab 64 of the bar support 62 to the leg plate 16 and integrally coupling the caulking tab 68 of the bar support 62 to the leg plate 18, the frame 12 can be prevented or suppressed from deforming such that one of the leg plate 16 or the leg plate 18 approaches or separates from the other of the leg plate 16 or the leg plate 18. A one width direction edge (the upper edge) of the bar support 62 that has thus been integrally coupled to the frame 12 is positioned at the rear side than the distal end of the curved portion 54, and a face of the curved portion 54 on the center of curvature side (on the spool 22 side) and the entire region of the one width direction edge (the upper edge) of the bar support 62 face each other along the up-low direction.

Operation and Advantageous Effects of the Present Exemplary Embodiment Explanation follows regarding operation and advantageous effects of the present exemplary embodiment.

In the webbing take-up device 10 the webbing 30 is pulled out from the spool 22 as the spool 22 rotates in the pull-out direction when, for example, an occupant seated in the vehicle rear seat in a seating position corresponding to the webbing take-up device 10 pulls out the webbing 30 in order to put on the webbing 30. Accordingly the webbing 30 achieves a fitted state around the body of the occupant when the pulled out webbing 30 has been placed around the body of the occupant and a tongue provided to the webbing 30 has been placed in a buckle.

When rapid vehicle deceleration occurs in this fitted state and the body of the occupant pulls on the webbing 30 abruptly due to the rapid vehicle deceleration, the rotational acceleration of the spool 22 in the pull-out direction reaches a specific magnitude or greater, and the lock mechanism provided on the outside of the leg plate 16 actuates. The lock pawl 34 is pulled out from the pawl housing section 32 when the spool 22 is rotated in the pull-out direction with the lock mechanism in the actuated state. The ratchet teeth 38 of the lock pawl 34 accordingly mesh with the ratchet teeth 40 formed to the leg plate 16.

Rotation of the spool 22 in the pull-out direction is accordingly restricted so as to thereby restrict the webbing 30 from being pulled out from the spool 22. Restricting the webbing 30 from being pulled out from the spool 22 in this manner enables the webbing 30 to restrain the body of the occupant from relative movement towards the vehicle front side under inertia, and relative movement under inertia of the occupant towards the vehicle front side can be suppressed.

In the webbing take-up device 10, as described above, the webbing 30 pulled out from the spool 22 passes through between the rear back plate section 14 and the front back plate section 52, and, along the upper face of the front back plate section 52 (the face of the front back plate section 52 on the opposite side to the leg plates 16 and 18), extends towards the front. Therefore when the webbing 30 is pulled towards the leading end side (in particular when the leading end side of the webbing 30 is pulled when rotation of the spool 22 in the pull-out direction is in a restricted state), the spool 22 is pulled upwards, and the front end sides of the leg plates 16 and 18 that indirectly support the both axial direction ends of the spool 22 are also pulled upwards and displaced.

Figure 2B:
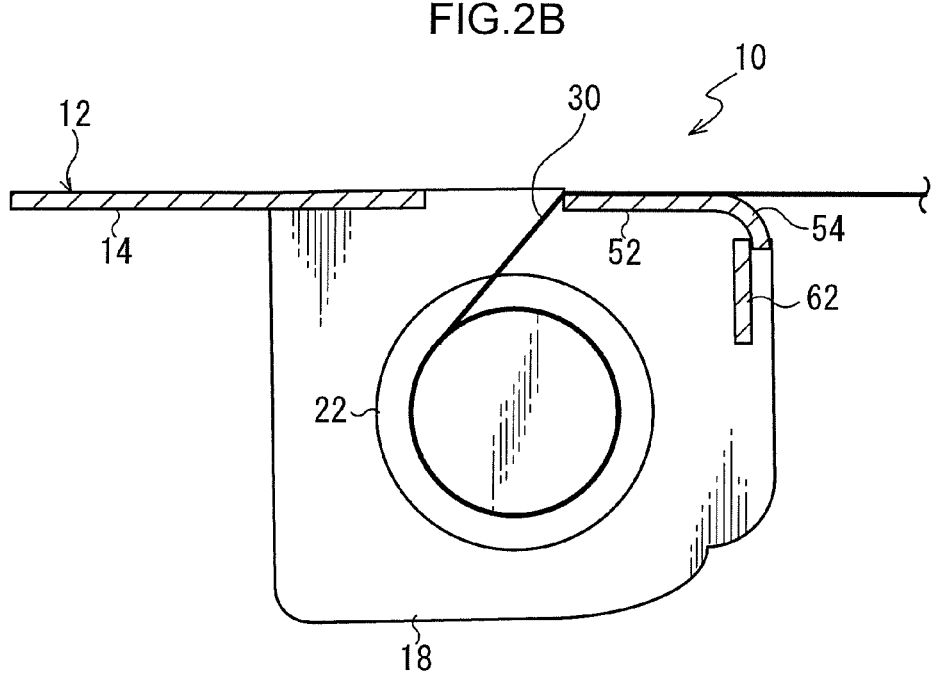

When the front end sides of the leg plates 16 and 18 are displaced upwards, the bar support 62 provided so as to couple together the front end sides of the leg plates 16 and 18 is also displaced upwards together with the leg plates 16 and 18. However, as described above, the entire region of the one width direction edge (the upper edge) of the bar support 62 faces the face of the curved portion 54 on the center of curvature side along the up-low direction. Accordingly, when the bar support 62 rises together with the leg plates 16 and 18, the bar support 62 abuts the curved portion 54, as shown in FIG. 2B. Any further rise of the bar support 62, and hence also rise of the leg plates 16 and 18, is thereby suppressed. Hence deformation of the frame 12 such that the leg plates 16 and 18 are separated away from each other (such that the leg plates 16 and 18 open) accompanying rise of the leg plates 16 and 18 can be prevented or efficiently suppressed.

The bar support 62 is formed in a plate shape as described above. The bar support 62 accordingly has higher rigidity to load from the width direction than to load from the thickness direction. Due to the one width direction edge of the bar support 62 interfering with the front end portion of the front back plate section 52, the bar support 62 accordingly has a high rigidity to load from the front back plate section 52 despite the bar support 62 being formed in a plate shape.

Displacement and/or deformation of the front back plate section 52 can be prevented or efficiently suppressed.

In the present exemplary embodiment, it is configured that the face of the curved portion 54 on the center of curvature side (on the spool 22 side) and the one width direction edge (the upper edge) of the bar support 62 face each other along the up-low direction. However, the structure of the front end portion of the front back plate section 52 is not limited to the structure such as the curved portion 54. It is possible that the front end side portion (the one end side portion in a direction orthogonal to the thickness direction of the front back plate section 52) of the front back plate section 52 and the one width direction edge (the upper edge) of the bar support 62 are positioned adjacent (vicinage) and face each other along the up-low direction (the thickness direction of the front back plate section 52) such that when the bar support 62 rises together with the leg plates 16 and 18, the bar support 62 interferes with (abuts) the front end side portion of the front back plate section 52.

In the present exemplary embodiment, it is possible to be configured that the one width direction edge (the upper edge) of the bar support 62 is made contact with the front end portion of the front back plate section 52, and it is possible to be configured that the one width direction edge (the upper edge) of the bar support 62 is separated from the front end portion of the front back plate section 52, and the bar support 62 interferes with the front end portion of the front back plate section 52 when the front back plate section 52 has deformed downwards, so as to thereby suppress any further displacement or deformation of the front back plate section 52.

In the present exemplary embodiment configuration is made such that the entire region at the one width direction edge of the bar support 62 makes contact with the front back plate section 52, however the present invention is not limited to such a configuration. Configuration may be made, for example, such that the width dimension of the bar support 62 is appropriately changed in the length direction of the bar support 62 such that only a portion of the bar support 62 makes contact with the front back plate section 52. Namely, for example, configuration may be made such that only a portion of the front back plate section 52 where there is a large amount of deformation due to the load from the webbing 30 is caused to abut the bar support 62, thereby preventing or suppressing deformation of the front back plate section 52.

In the present exemplary embodiment the bar support 62 is formed in a plate shape, however the bar support 62 may be formed in another shape other than a plate shape, such as for example a round bar shape or a square bar shape.

The bar support 62 is also provided so as to be across between the leg plate 16 and the leg plate 18 in order to prevent or suppress the leg plate 16 and the leg plate 18 from moving towards or away from each other. However the interfering member of the present invention is not limited to such a mode. Namely, as long as the interfering member basically interferes with the front back plate section 52 and prevents or suppresses displacement or deformation of the front back plate section 52, it is not essential to adopt a configuration capable of directly preventing or suppressing the leg plate 16 and the leg plate 18 from deforming towards or away from each other.

What is claimed is:

1. A webbing take-up device comprising:
   a frame in which a pair of leg plates extend from a plate shaped back plate towards one side in a thickness direction of the back plate;
   a spool that is provided between the pair of leg plates, an axial direction of the spool being along a facing direction of the pair of leg plates and both ends of the spool being directly or indirectly supported by the pair of leg plates;
   a webbing having a base end that is anchored to the spool, the webbing being pulled out towards the other side which is an opposite side from the one side in the thickness direction of the back plate and extending along the back plate; and
   an interfering member that is provided at the leg plates at the one side in the thickness direction of the back plate with respect to the back plate, the interfering member interfering with the back plate so as to restrict deformation of the frame in a direction in which the leg plates approach the back plate,
   wherein the interfering member is normally separately spaced apart from the back plate, and contacts the back plate only when the leg plates are displaced as a result of the webbing being pulled forcefully from the spool.

2. The webbing take-up device of claim 1, wherein
   the interfering member is a reinforcement member configured such that: one end of the reinforcement member is anchored to one of the pair of leg plates and the other end of the reinforcement member is anchored to the other of the pair of leg plates to restrict displacement of the leg plates in a direction in which the pair of leg plates are away from each other; and
   the reinforcement member is capable of interfering with the back plate from the one side in the thickness direction of the back plate.

3. The webbing take-up device of claim 2, wherein one end side of the back plate in a direction orthogonal to the thickness direction of the back plate and one end in a width direction of the interfering member are positioned adjacent and face each other along the thickness direction of the back plate.

4. The webbing take-up device of claim 2, wherein the interfering member is formed in a plate shape with a width direction thereof being along the thickness direction of the back plate, and one end in the width direction of the interfering member is capable of interfering with the back plate.

5. The webbing take-up device of claim 1, wherein the interfering member is formed in a plate shape with a width direction thereof being along the thickness direction of the back plate, and one end in the width direction of the interfering member is capable of interfering with the back plate.

6. The webbing take-up device of claim 1, wherein one end side of the back plate in a direction orthogonal to the thickness direction of the back plate and one end in a width direction of the interfering member are positioned adjacent and face each other along the thickness direction of the back plate.

7. The webbing take-up device of claim 6, wherein the one end side of the back plate in the direction orthogonal to the thickness direction of the back plate is configured by a curved portion that curves towards the one side in the thickness direction of the back plate.

8. The webbing take-up device of claim 7, wherein a face of the curved portion on a side of the spool and the one end in the width direction of the interfering member are positioned to face each other.

9. The webbing take-up device of claim 1, wherein the webbing extends through the back plate and slidably engages a rear face of the back plate.

* * * * *